United States Patent
Cook et al.

(10) Patent No.: US 12,544,062 B1
(45) Date of Patent: Feb. 10, 2026

(54) CONSTRUCTS AND METHODS FOR TISSUE REPAIR

(71) Applicant: RIVERPOINT MEDICAL, LLC, Portland, OR (US)

(72) Inventors: Nathan Daniel Cook, Portland, OR (US); Elliot Bixby, Gladstone, OR (US); John Thomas Ferguson, Portland, OR (US)

(73) Assignee: Riverpoint Medical, LLC, Portland, OR (US)

( * ) Notice: Subject to any disclaimer, the term of this patent is extended or adjusted under 35 U.S.C. 154(b) by 244 days.

(21) Appl. No.: 17/592,292

(22) Filed: Feb. 3, 2022

Related U.S. Application Data

(60) Provisional application No. 63/145,402, filed on Feb. 3, 2021.

(51) Int. Cl.
*A61B 17/04* (2006.01)
*A61B 17/06* (2006.01)

(52) U.S. Cl.
CPC .... *A61B 17/0485* (2013.01); *A61B 17/06166* (2013.01); *A61B 2017/0475* (2013.01)

(58) Field of Classification Search
CPC .......... A61B 17/0485; A61B 17/06166; A61B 2017/0475; A61B 2017/0461; A61B 2017/0459; A61B 2017/06185; A61B 2017/0496; A61B 17/0487; A61B 2017/0462; A61B 17/0401; A61B 2017/0406; A61B 2017/0477; A61F 2/0811; A61F 2002/0817; A61F 2002/0852
See application file for complete search history.

(56) References Cited

U.S. PATENT DOCUMENTS

| | | | |
|---|---|---|---|
| 5,989,252 A * | 11/1999 | Fumex | A61B 17/0401 606/232 |
| 9,320,512 B2 | 4/2016 | Dooney | |
| 9,463,011 B2 * | 10/2016 | Dreyfuss | A61B 17/0401 |
| 9,504,462 B2 | 11/2016 | Dooney | |
| 10,058,322 B2 | 8/2018 | Dooney | |
| 10,070,856 B1 | 9/2018 | Black et al. | |
| 10,524,776 B2 | 1/2020 | Dreyfuss | |
| 10,849,734 B2 * | 12/2020 | Holowecky | A61B 17/0485 |
| 11,076,844 B2 | 8/2021 | Black et al. | |
| 2009/0318961 A1 * | 12/2009 | Stone | A61B 17/0401 606/228 |
| 2012/0191109 A1 * | 7/2012 | Rockrohr | A61B 17/0401 606/144 |
| 2015/0032157 A1 | 1/2015 | Dooney | |
| 2020/0178950 A1 | 6/2020 | Burkhart | |
| 2020/0205799 A1 | 7/2020 | Burkhart | |

* cited by examiner

*Primary Examiner* — Elizabeth Houston
*Assistant Examiner* — Daniel Icet
(74) *Attorney, Agent, or Firm* — BrainSpark Associates, LLC

(57) ABSTRACT

A tissue repair construct, having a repair strand, defining a lumen and having a first end defining an opening of the lumen and a second end opposed to the first end. Further, a shuttle having a loop at a first end and a pull end, opposed to the first end, is engaged through the lumen of the repair strand, entering at the opening and exiting at a broach point through the repair strand, the loop extending out of the opening and the pull end being coincident to the second end of the repair strand.

9 Claims, 4 Drawing Sheets

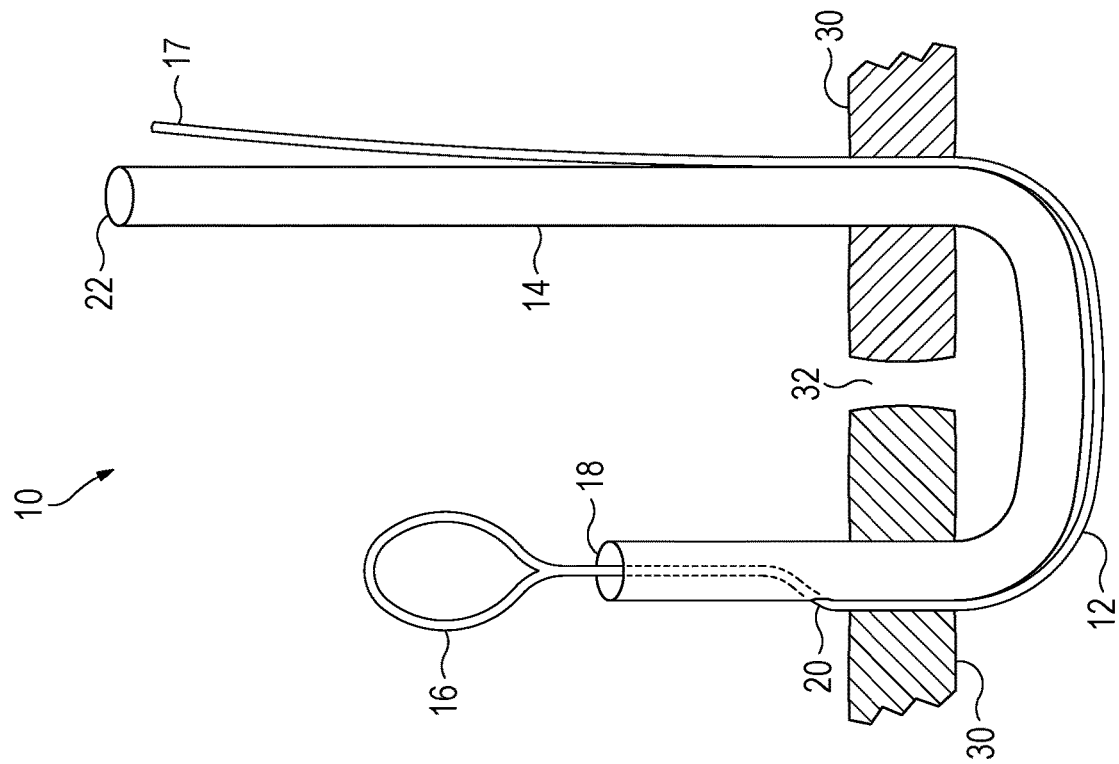
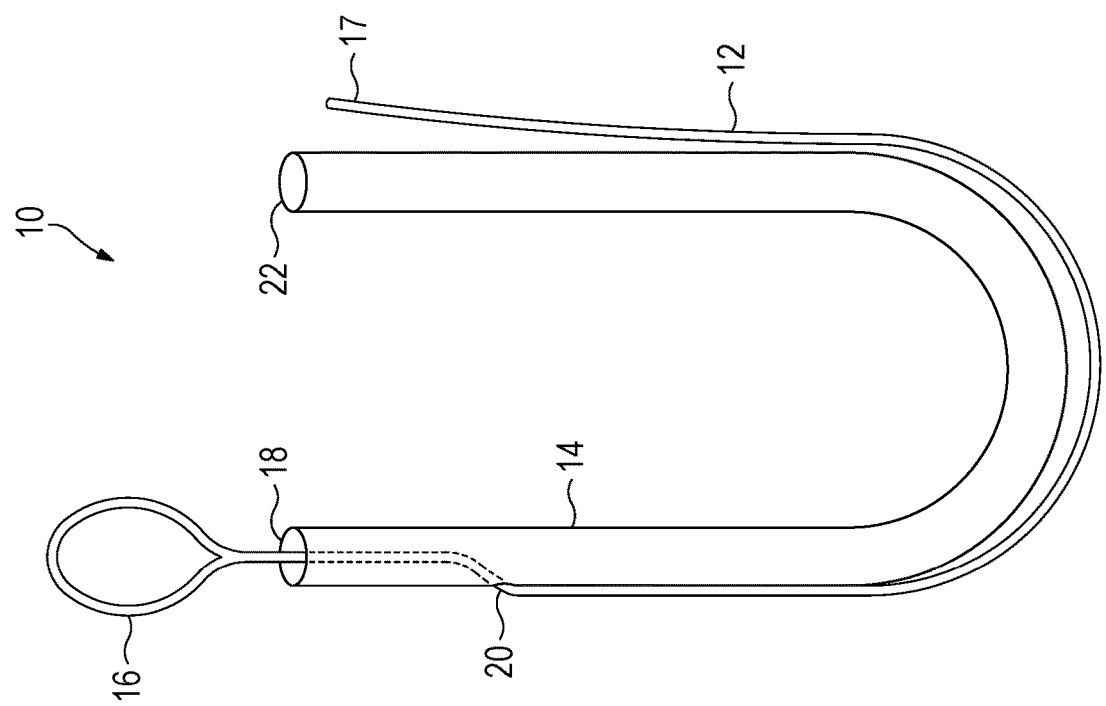

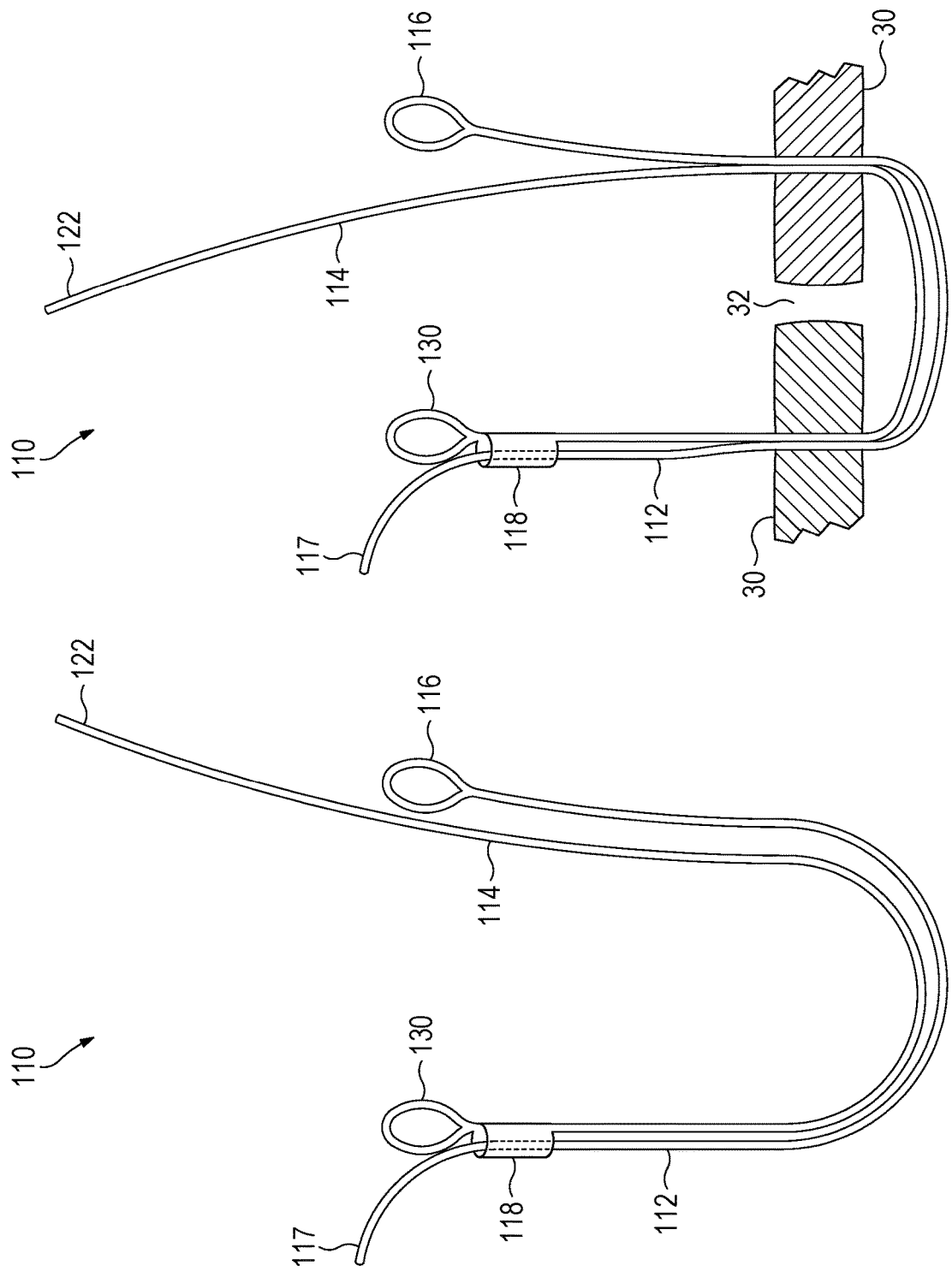

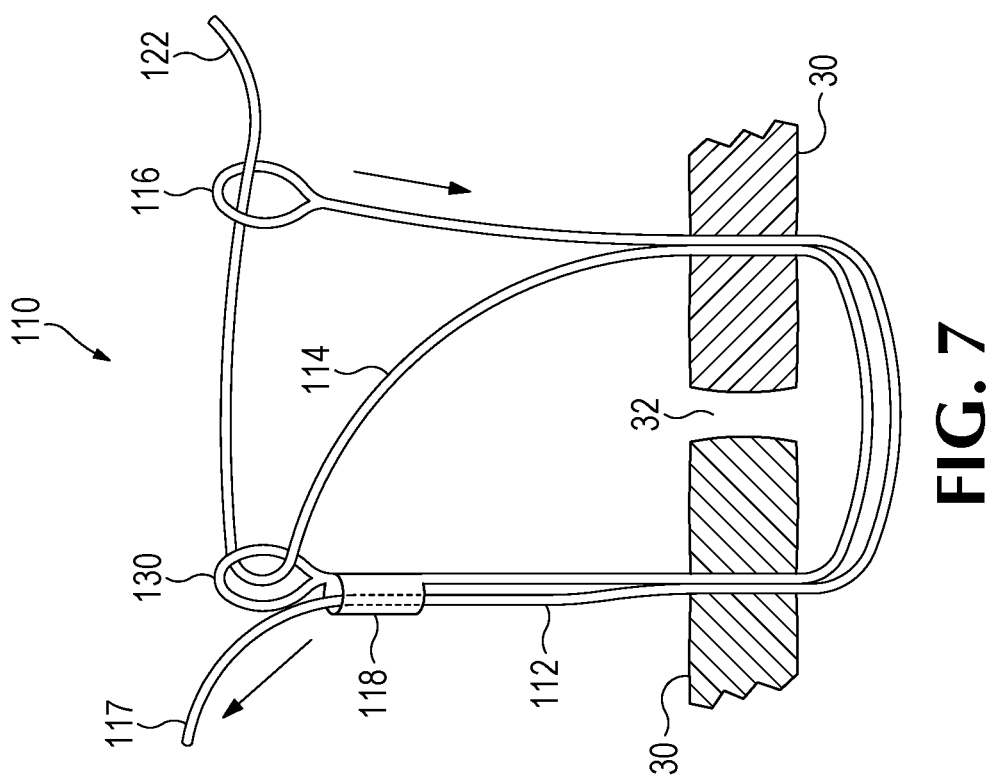
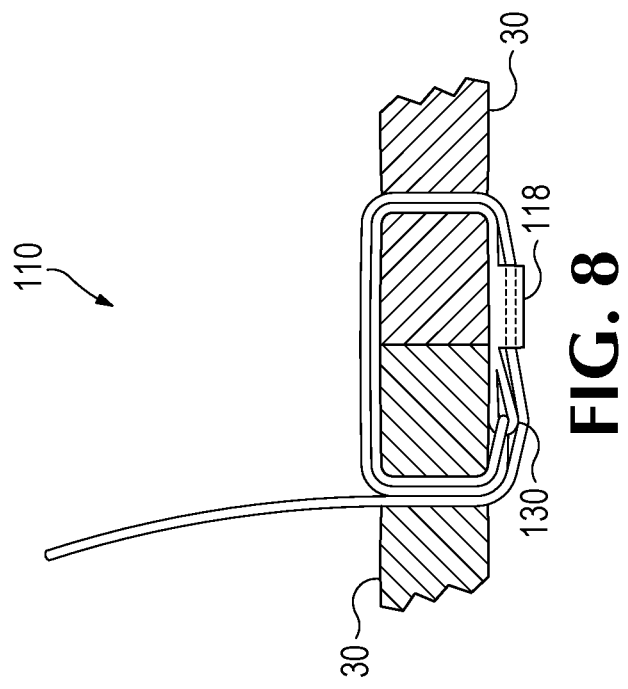

CONSTRUCTS AND METHODS FOR TISSUE REPAIR

BACKGROUND OF THE INVENTION

For an arthroscopic surgeon, tying knots is well worth avoiding. Not only is the task time consuming, but also it creates a potential failure point and a sort of a potential patient irritant. Accordingly, constructs and methods that permit a surgeon to avoid tying knots are increasingly popular. But these constructs may create their own set of problems, if there is a requirement that the surgeon perform a difficult task, such as splicing one suture into another. Accordingly, there is a need for constructs that are both easy-to-use and that relieve a surgeon from the task of tying a knot.

SUMMARY

In a first separate aspect, the present invention may take the form of a tissue repair construct having a repair strand, defining a lumen and an opening of the lumen. Further, a shuttle having a loop is engaged through the lumen of the repair strand and the repair strand is hardened at the opening, thereby facilitating the task pulling the shuttle loop through the opening.

In a second separate aspect, the present invention may take the form of a method of repairing a tear in tissue, utilizing a tissue repair construct, having a repair strand, defining a lumen and having a first end defining an opening of the lumen and a second end opposed to the first end. The construct also includes a shuttle having a loop at a first end and a pull end, opposed to the first end, the shuttle being engaged through the lumen of the repair strand, entering at the opening and exiting at a broach point through the repair strand, the loop extending out of the opening and the pull end being coincident to the second end of the repair strand. In the method, the tissue is pierced on either side of the tear, and both the second end of the repair strand and the pull end of the shuttle is pushed first through tissue on a first side of the tear and then through tissue on a second side of the tear. Then the second end of the repair strand is engaged to the loop and the pull end of the shuttle is pulled, thereby pulling the loop into the opening and then out of the broach point and tightening the repair around the tear, thereby closing the tear and binding tissue on either side of the tear together.

In a third separate aspect, the present invention may take the form of a method of repairing a tear in tissue, utilizing a tissue repair construct, having a repair strand, defining a lumen and having an opening on either end of the lumen and a repair strand loop, fixed to the opening and defining a first end of the repair strand and a second end opposed to the first end. Also included in the construct is a shuttle having a pull end coincident to the repair strand loop and a shuttle loop, opposed to the first end and being coincident to the second end of the repair strand, the shuttle being engaged through the lumen of the repair strand, entering at an opening and exiting at an opposed opening. In the method, tissue is pierced on either side of the tear, and both the second end of the repair strand and the shuttle loop is pushed first through tissue on a first side of the tear and then through tissue on a second side of the tear. Then the second end of the repair strand is engaged first through the repair strand loop and then through the shuttle loop, and the pull end of the shuttle is pulled, thereby pulling the shuttle loop and the repair strand loop and forming a tight loop about the tear.

In a fourth separate aspect, the present invention may take the form of a tissue repair construct, having a repair strand, defining a lumen and having a first end defining an opening of the lumen and a second end opposed to the first end. Further, a shuttle having a loop at a first end and a pull end, opposed to the first end, is engaged through the lumen of the repair strand, entering at the opening and exiting at a broach point through the repair strand, the loop extending out of the opening and the pull end being coincident to the second end of the repair strand.

In a fifth separate aspect, the present invention may take the form of a tissue repair construct, having a repair strand, defining a lumen and having an opening on either end of the lumen and a repair strand loop, fixed to the opening and defining a first end of the repair strand and a second end opposed to the first end. Further, a shuttle having a pull end coincident to the repair strand loop and a shuttle loop, opposed to the first end and being coincident to the second end of the repair strand, is engaged through the lumen of the repair strand, entering at an opening and exiting at an opposed opening.

BRIEF DESCRIPTION OF THE DRAWINGS

FIG. 1 shows a plan view of a tissue connecting construct in accordance with an embodiment of the present invention.

FIG. 2 shows a first step in the deployment of the construct of FIG. 1.

FIG. 5 shows a plan view of a tissue connecting construct in accordance with an alternative embodiment of the present invention.

FIG. 6 shows a first step in the deployment of the construct of FIG. 5.

FIG. 7 shows a second step in the deployment of the construct of FIG. 5.

FIG. 8 shows a third step in the deployment of the construct of FIG. 5.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 4:
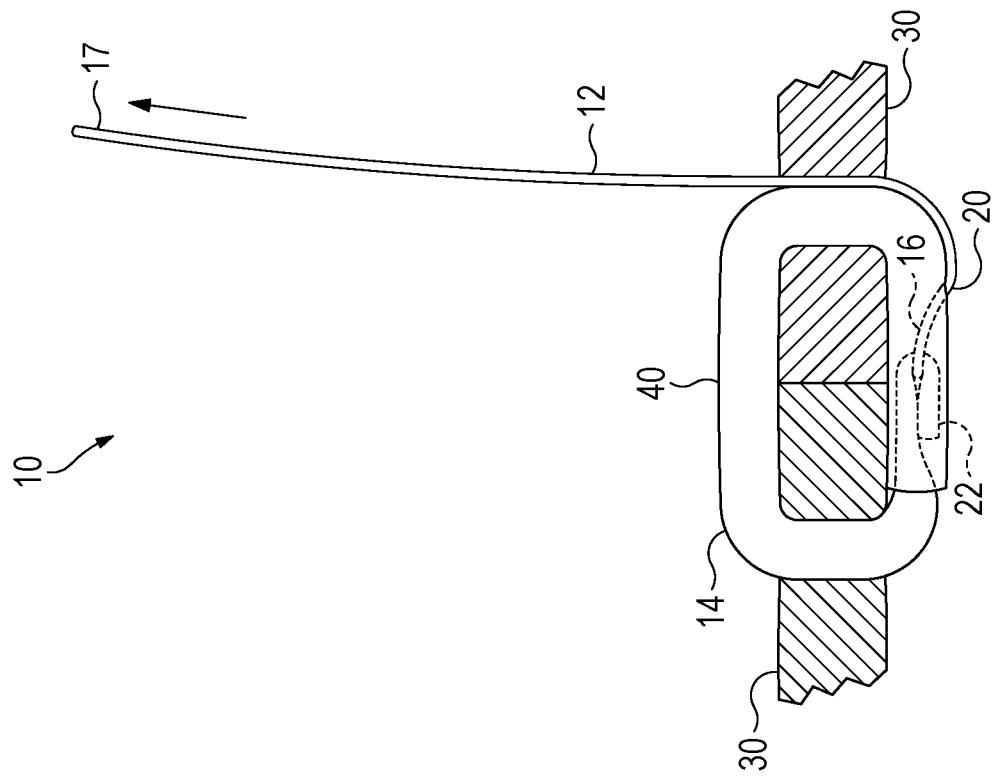
FIG. 4 shows a third step in the deployment of the construct of FIG. 1.
Figure 3:
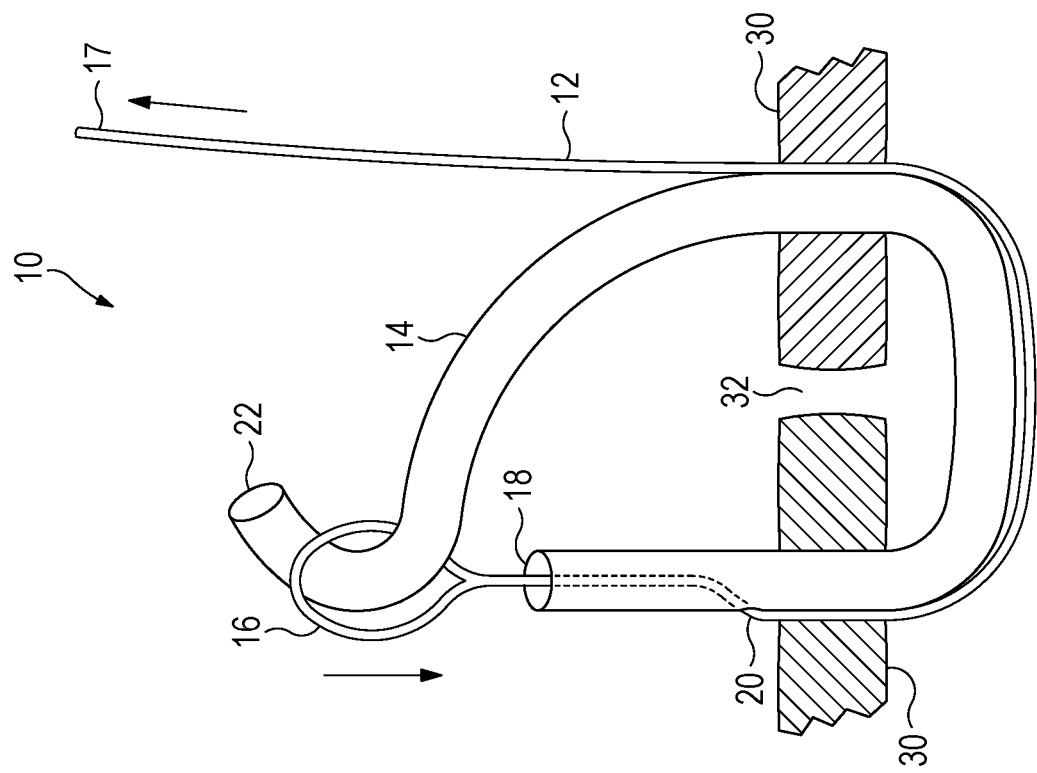
FIG. 3 shows a second step in the deployment of the construct of FIG. 1.

Referring to FIG. 1, a tissue connecting construct 10 includes a shuttle 12 engaged to a repair strand 14. Shuttle 12 includes a loop 16 and a pull end 17. Shuttle 12 enters the lumen of repair strand 14 at a stiffened opening 18, broaches strand 14 at broach point 20, where shuttle 12 exits strand 14. Strand 14 has a transitioned end 22, which is thinner than most of strand 14, and may be achieved by splicing a thinner suture onto the thicker suture that forms the bulk of strand 14. FIGS. 2-4 show the use of construct 10, with FIG. 2 showing construct 20 engaged to two tissue extents 30, with shuttle 12 and strand 14 both passing through the tissue extents 30. Tissue extents 30 may be, for example, a portion of meniscus with a tear 32 separating the two extents 30. In FIG. 3, the transitioned end 22 of repair strand 14 is engaged to loop 16 of shuttle 12. The pull end of shuttle 12 is then pulled, causing end 22 to be pulled into stiffened opening 18. FIG. 4 shows the final result, after end 17 is further pulled, pulling a portion of strand 14 in the lumen of another portion of strand 14, thereby forming a loop 40. In one method, loop 16 is left inside of stiffened opening 18, which has been pulled to the underside of tissue extents 30, which are pulled together, repairing tear 32. A finger trap is formed, negating any need to tie a knot, and forming a tight bond holding loop 40 and thereby tissue extents 30 together.

Notably, the performance of the method is greatly facilitated by the stiffened opening 18, which far more easily accepts end 22. This acceptance is also facilitated by the reduced size of transitioned end 22. In some embodiments the transition end 22 of the repair strand 14 is joined to the pull end 17 of the shuttle 12 to facilitate passing these two ends 17 and 22 through tissue extents 30. In various embodiments this is achieved by stitching the two ends 17 and 22 together, passing one through the other or splicing one into the other. In most methods, a needle is attached to the combined end of 17 and 22 to pierce through tissue extents 30 and pull ends 17 and 22 through. After successfully passing ends 17 and 22 through tissue extents 30, ends 17 and 22 can be separated, as shown in FIG. 3.

Referring to FIG. 5, in an alternative embodiment of a tissue connection construct 110, the position of the shuttle 112 is reversed. The repair strand 114 includes a continuous repair strand body having lumen extending through at least a portion of the continuous repair strand body, a first end, and a second end, the continuous repair strand body extending between the first end and the second end. The lumen includes a first lumen opening and a second lumen opening. The lumen may further comprise a stiffened opening 118. The shuttle 112 includes a continuous shuttle strand body, a shuttle loop 116 and a pull end 117, the continuous shuttle strand body extending between the shuttle loop 116 and the pull end 117. The shuttle loop 116 being displaced from the stiffened opening 118 and with the pull end 117 emerging from the stiffened opening 118 and/or lumen of the repair strand 114. Also, the repair strand 114 includes a fixed loop 130, affixed to stiffened opening 118 and/or lumen. Referring to FIGS. 6-8, to deploy, the shuttle loop 116 and the transitioned end 122 are pushed through both tissue extents 30, in one embodiment by attaching both shuttle loop 116 and end 122 to a needle that is used to pierce tissue extents 30. Transitioned end 122 is threaded first through fixed loop 130 and then through shuttle loop 116 and pull end 117 is pulled to pull first the shuttle loop 116 through both tissue extents 30, and the fixed loop 130 through the right most tissue extent 30 (as it appears in FIGS. 6-8). In FIG. 8, shuttle 112 has been entirely pulled free and is not shown. Similar to the method described in conjunction with FIGS. 2-4, shuttle loop 116 is in some embodiments joined to transitioned end 122 to facilitate passage through tissue extents 30. The benefits of stiffened opening 118 and transitioned end 122 are also evident in this method.

The disclosed embodiments are illustrative, not restrictive. While specific configurations of the [technology] have been described, it is understood that the present invention can be applied to a wide variety of [technology category]. There are many alternative ways of implementing the invention.

What is claimed is:

1. A tissue repair construct, comprising:
    a) a repair strand including a continuous repair strand body having a lumen extending through at least a portion of the continuous repair strand body, a first end, and a second end, the continuous repair strand body extending between the first end and the second end, the first end including a repair loop, the lumen including a first lumen opening and a second lumen opening, the repair loop positioned immediately adjacent to the first lumen opening along a longitudinal axis of the repair strand at the first end of the repair strand and the second end opposed to the first end; and
    b) a shuttle strand including a continuous shuttle strand body, a pull end and a shuttle loop, the continuous shuttle strand body extending between the shuttle loop and the pull end, the pull end is opposed to the shuttle loop, the pull end extends into the second lumen opening to exit out the first lumen opening, the pull end immediately adjacent to the repair loop and the shuttle loop positioned proximate to the second end of the repair strand.

2. The tissue repair construct of claim 1, wherein the first lumen opening and the second lumen opening of the lumen are hardened relative to other portions of the repair strand.

3. The tissue repair construct of claim 1, wherein the repair strand includes a first suture portion having a first transverse extent, and a second suture portion having a lesser transverse extent than the first suture portion and which is spliced onto the first suture portion.

4. The tissue repair construct of claim 1, wherein the repair loop comprises a fixed loop.

5. The tissue repair construct of claim 1, wherein the lumen is stiffened.

6. The tissue repair construct of claim 1, at least a portion of the shuttle loop is joined to second end of the repair strand.

7. The tissue repair construct of claim 6, wherein joining comprises stitching or splicing.

8. The tissue repair construct of claim 1, wherein the second end of the repair strand includes a transitioned end.

9. The tissue repair construct of claim 8, wherein the transitioned end is reduced in transverse dimension relative to other portions of the repair strand.

* * * * *